Figure 2:
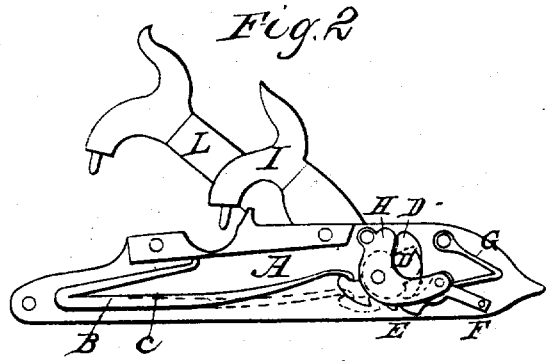

A6725 OR X 9,839

Locks.

DRAFTSM.

J. MARSH.

Double Shot Gun.

Patented July 1, 1836.

9839x.

N. PETERS, Photo-Lithographer, Washington, D. C.

July 1, 1836

Johnson Marsh Jun[illegible]

Letters Patent

The Schedule referred to in these Letters Patent and making part of the same, containing a description in the words of the said Johnson Marsh Junr of his improvement in the Gun or Pistol lock ..........

To all to whom these presents shall come, Be it known that I Johnson Marsh of [illegible] in the County of Bennington and State of Vermont, have invented a new and useful improvement in the manner of Constructing the Gun or Pistol lock, and so adapting it to the barrel thereof as to cause two charges to be discharged from one and the same [illegible] or Chamber, and also in the manner of separating such charges so as to prevent them from communicating; and that the following is a full and exact description of the construction and operation of the said improvement as invented by me, reference being had to the drawing hereunto annexed, and to the figures and letters marked thereon.

Figure 1:
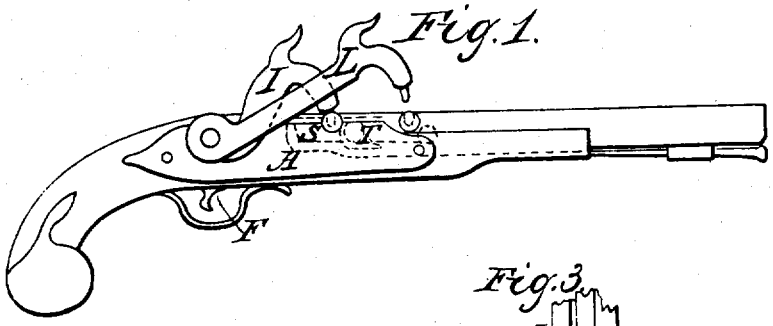
Figure 1:
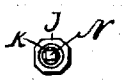

My invention relates to a peculiar arrangement of the parts of the ordinary Lock, so as to enable it to discharge two cocks or hammers when either [illegible] a [illegible] hole are used; and these fall upon as many separate [illegible] either at [illegible] or together, said [illegible] being placed in the ordinary situation for the [illegible] with the barrel, a little in advance thereof, that in order to the better understanding of my invention I will now describe the drawing hereunto annexed and the figures and letters marked thereon, that is to say, Description of the drawing Fig 1 is a side view of my pistol, showing the adaptation of two hammers to the two [illegible] Fig 2 is a view of the inside of the lock, showing the position of the various parts at the time one hammer is cocked while the other is uncocked, and that this is effected by the change in the relative situation of the parts, as commonly used for the [illegible], and for the [illegible] by [illegible] the distinct [illegible] as well [illegible] the [illegible] being [illegible] at the end furthest from [illegible] and [illegible] with the [illegible] of the lock, in this Fig A represents [illegible] [illegible] from the [illegible]

9839X

C for the purpose of operating on both the tumblers separately. M.N. shew the two tumblers
in their relative positions at a cock or discharge. they are both secured at cock or half
cock by the same dog K which is disengaged by its trigger F in the usual way.
The scuttle spring G and the plate I I are like those in use now. The first hammer
I which is to explode the charge first put in is connected with its tumbler by the or-
-dinary cylindrical pivot I which is with its counterpart shewn in section the
more clearly to exhibit their construction.

Figure 3:
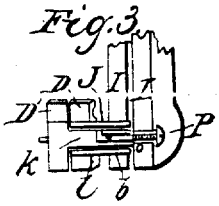

Through this cylinder a round bore allows the passage of the pivot
K belonging to the second hammer Ts. This last pivot is made round to the part H
[illegible] to pass through the cylinder I having at one end a square H to fix into the tumbler
N as shewn in Fig 3 and at the other is a square, having a shoulder on the round
part at O for the hammer Ts to be set against.

A small hole is to be drilled about half way through this pivot K
in the direction of its length from end through the square O into which is to enter
the small screw P which is to secure both the hammers on. But this screw
must be shorter than the hole so as to allow a space Q to be filled with oil
which is to flow out by the opening in Fig 3 shewn at R into the space of joint
formed by the working of the round pivot K in the cylindrical one I this oil
provides for the free action of the first hammer. The construction and operation
of the lock being thus described it remains to shew the manner of preventing the
communication of the charges at the instant of explosion as they are
both driven into the same barrel one over the other.

This is done by covering in the charge of powder into the chamber
X shewn in fig 2 and upon it forming the ball which is to be previously wrapped
in a patch of India Rubber cloth which fabric is now well known by
that name or in a thin sheet of the India Rubber itself and is so called
[illegible] represented in Fig 2 at Y and [illegible] [illegible] the [illegible]
of the second charge which is to be simply pressed in on the top of the patch
ball and then a wad is to be [illegible] that it may be [illegible].
There cannot be [illegible] [illegible] [illegible] [illegible] by the [illegible]
[illegible] of the second as it will not [illegible] the [illegible] of the chamber [illegible]
[illegible] should it be [illegible] [illegible] [illegible] the [illegible]
[illegible] from the top of the [illegible] [illegible] [illegible]

9839x

[illegible] the plate of the lock perfectly plane and smooth along its side.
What I claim as my invention and for which I now ask Letters Patent
is the manner in which I arrange the two Tumblers & the two Main springs
to be acted on by the separate hammers or cocks so as to effect the separate
discharges and the manner in which I provide for [illegible] the space be-
tween the guides as will be found by any competent machinist different from
those [illegible] me. I do not claim for two discharges from the same
barrel & chamber as I am aware that has been already in use.

I also claim the use of the India rubber patch for the purpose above
set forth. In testimony that the above is a full description of my
improvements as invented by me I have hereunto set my hand Witnesses
Henry [illegible]
John Allot

[illegible] Nash

Ex'd
Ch[illegible]

1184 [illegible]

Drawing